United States Patent [19]

Schwartz

[11] 3,798,082

[45] Mar. 19, 1974

[54] TECHNIQUE FOR THE FABRICATION OF A PN JUNCTION DEVICE

[75] Inventor: Bertram Schwartz, Westfield, N.J.

[73] Assignee: Bell Telephone Laboratories, Incorporated, Murray Hill, N.J.

[22] Filed: Aug. 7, 1972

[21] Appl. No.: 278,639

Related U.S. Application Data

[62] Division of Ser. No. 83,416, Oct. 23, 1970, abandoned.

[52] U.S. Cl. .................. 148/188, 148/187, 148/189, 148/190, 317/235 R, 252/62.3 GA

[51] Int. Cl. .................................................. H01l 7/34

[58] Field of Search ......................148/188, 187, 148/190, DIG. 3–DIG. 5; 317/235 AG, 317/235 AD, 235 AL; 252/62.3 GA

[56] References Cited

UNITED STATES PATENTS

| | | | |
|---|---|---|---|
| 3,298,879 | 1/1967 | Scott et al. | 148/187 |
| 3,485,684 | 12/1969 | Mann et al. | 148/187 |
| 3,490,965 | 1/1970 | Webb | 148/188 |
| 3,245,847 | 4/1966 | Pizzarello | 148/177 |
| 3,629,018 | 12/1971 | Henderson et al. | 148/187 |
| 3,422,322 | 1/1969 | Haisty | 148/190 X |
| 3,547,717 | 12/1970 | Lindmayer | 148/187 |
| 3,392,193 | 7/1968 | Haisty et al. | 252/62.3 GA X |
| 3,344,071 | 9/1967 | Cronin | 252/62.3 GA |

*Primary Examiner*—G. T. Ozaki
*Attorney, Agent, or Firm*—E. M. Fink

[57] ABSTRACT

A passivated p-n junction device in which the junction is prevented from rising to the crystallographic surface by the interposition of a semi-insulating layer intermediate the crystallographic surface and the electrical surface is described. The structure is fabricated by forming a semi-insulating layer upon the surface of an n-type Group III(*a*) – V(*a*) compound semiconductor, generating a window therein and introducing a p-type material through the window.

8 Claims, 4 Drawing Figures

TECHNIQUE FOR THE FABRICATION OF A PN JUNCTION DEVICE

This application is a division of application Ser. No. 83,416, filed Oct. 23, 1970, now abandoned.

FIELD OF THE INVENTION

This invention relates to *p–n* junction devices and to a technique for the preparation and passivation thereof. More particularly, the present invention relates to Group III($a$) – V($a$) compound semiconductor devices including an imbedded and passivated *p–n* junction and to a technique for the fabrication thereof.

DESCRIPTION OF THE PRIOR ART

From the outset of semiconductor technology the significance of the device surface has been the subject of intensive study. It has been determined that the reliability of the device over a given period of time is dependent upon maintenance of the surface in its original condition even under adverse conditions. In order to obtain an optimum surface, it is necessary to eliminate or preclude the deposition of contaminants of a polar nature or of any substance that might break down or change its characteristics to form polar contaminants on the surface of the semiconductor body adjacent the junction therein.

Numerous attempts to create surfaces with the above-noted attributes have been made by workers in the art. Chemically etched surfaces have been dried and coated with silicone oil or grease, and coatings comprising silicone varnishes and alkyd-silicone combination resins have been employed. These techniques were followed by a variety of procedures for effecting the formation of silicon oxide layers upon the surfaces of silicon devices, various impurities being added to such oxides for the stabilization thereof.

Unfortunately, the prior art techniques have been plagued with limitations involving one or more factors detrimental to device reliability. With respect to the compound semiconductors, workers in the art have not been aware of any native oxides capable of effecting the desired end and the oxides of silicon have been found to be incompatible with the compound semiconductors. Accordingly, considerable interest has been focused upon the surfaces of compound semiconductors.

Pursuant thereto, I have undertaken a detailed study of the surfaces of the Group III($a$) – V($a$) compound semiconductors and as a result have discovered, contrary to the belief of prior art workers, that these compounds, in fact, are subject to degradation during service from the standpoint of electrical characteristics, particularly light output.

SUMMARY OF THE INVENTION

In accordance with the present invention, these prior art limitations are effectively obviated by a novel fabrication technique which results in a Group III($a$) – V($a$) compound semiconductor p-n junction device wherein the junction is passivated by preventing it from rising to the crystallographic surface of the structure by the interposition of a semi-insulating layer intermediate the crystallographic surface and the electrical surface. Briefly, the inventive technique involves coating a Group III($a$) – V($a$) n-type compound semiconductor with a material capable of producing deep centers in the bandgap of the semiconductor and heating the coated semiconductor thereby resulting in the compensation of free carriers and the preparation of a high resistivity semi-insulating surface layer. Subsequently, photolithographic techniques are utilized to generate a window in the semi-insulating layer and introduction of a p-type material into the exposed n-type semiconductor material is effected.

DETAILED DESCRIPTION OF THE INVENTION

Figure 1:
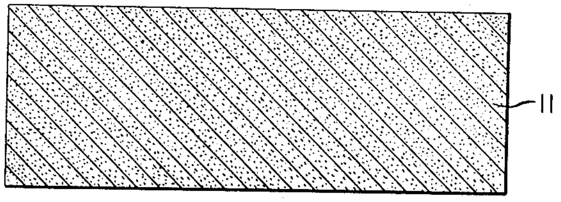
FIG. 1 is a front elevational view in cross section of a sample of an n-type Group III($a$) – V($a$) compound semiconductor material amenable to processing in accordance with the present invention.

With reference now to FIG. 1 there is shown in cross sectional view a sample of n-type Group III($a$) – V($a$) compound semiconductor 11, typically having a carrier concentration within the range of $10^{16}$ to $10^{18}$ atoms/cm$^3$ and a bandgap within the range of 1 to 2.5 electron volts. Materials meeting these requirements include gallium arsenide, aluminum gallium arsenide, gallium phosphide, gallium arsenide phosphide and other mixed III($a$) – V($a$) compounds. Materials selected for use herein are typically obtained from commercial sources and may be grown by any well-known procedure as for example, floating zone techniques, the Bridgeman technique, etc.

Figure 2:
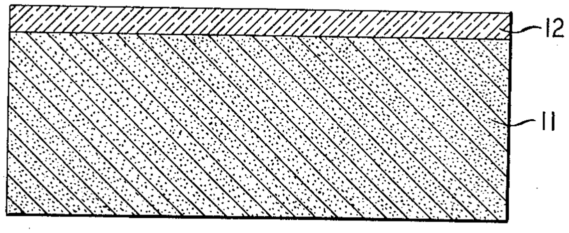
FIG. 2 is a cross sectional view of the structure of FIG. 1 after the formation therein of a semi-insulating layer.

The semiconductor material so obtained is initially cut into the desired size, lapped, etched and polished in accordance with conventional procedures. Thereafter, a material capable of generating a deep center and high resistivity ($10^5$—$10^8$ ohm-cm) in the semiconductor material is introduced into the crystal. This end may conveniently be attained by (1) electroplating the material onto the major surfaces of the sample, (2) by vapor transport techniques or (3) by vacuum deposition of thin films of the order of 1,000 A in thickness and subsequent heating to effect diffusion. The thickness of the film deposited pursuant to the foregoing techniques may range from 500 to 1,500 A dependent upon the depth of the semi-insulating layer desired, minima and maxima being dictated by practical considerations. Following, diffusion of the deep center into the crystal is effected by heating the coated substrate in accordance with well-known techniques. Chromium would typically be heated to a temperature within the range of 850° to 880° C for a time period ranging from 1 to 16 hours. The resultant structure shown in FIG. 2 includes a semi-insulating layer 12. Materials found suitable for use in the generation of a deep center include chromium, lithium, and iron.

The next step in the fabrication of a *p–n* junction device involves generating a suitable window or aperture in the semi-insulating material. This end may be attained by conventional photolithographic techniques wherein a photoresist is initially deposited upon the semi-insulating layer, exposed to a suitable light source, developed and etched, thereby resulting in the removal of a portion of the semi-insulating layer.

Figure 3:
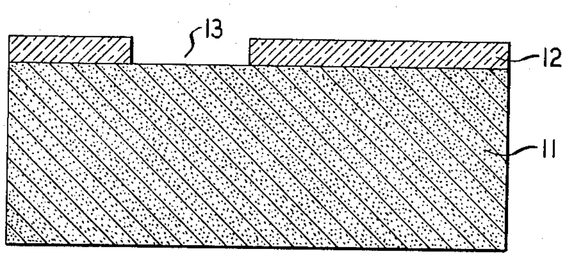
FIG. 3 is a cross sectional view of the structure of FIG. 2 after the generation of a window in the semi-insulating layer thereof.

The resultant structure shown in FIG. 3 includes window 13. At this juncture, it may be considered desirable to deposit a suitable mask upon the semi-insulating material if that material is so thin that the subsequent diffusion of a dopant into the *n*-type compound semiconductor material will cause penetration in a multiplicity of areas. A suitable mask for this purpose could comprise silicon nitride or any well-known diffusion mask.

Figure 4:
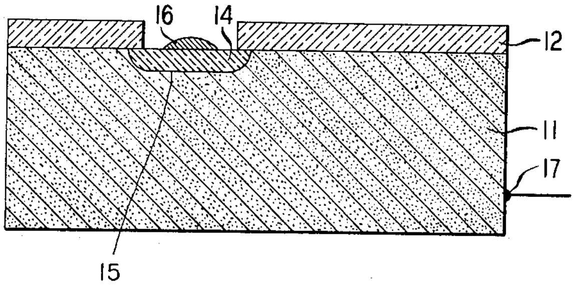
FIG. 4 is a cross sectional view of the structure of FIG. 3 after the formation of a p-type region has been effected and ohmic contacts applied thereto.

Finally, a p-type material is introduced as a dopant into the Group III(*a*) – V(*a*) compound semiconductor crystal through window 13 by conventional techniques such as diffusion, alloying, ion implantation, etc., thereby resulting in the structure shown in FIG. 4 including a region of *p*-type material 14 and *p–n* junction 15. In the fabrication of an operative device, it is necessary to make appropriate ohmic contact to the different zones of the body. Accordingly, there is formed on selected portions of *p*-type region 14 a metallic film 16 to serve as the ohmic contact. To this end, there is advantageously evaporated a thin film of any well-known conductive material suitable for ohmic contacts such as zinc doped gold, on the surface thereof, any conventional technique being utilized for this purpose. An ohmic connection 17 may also be made to the bulk *n*-type portion of the body 11 by conventional procedures.

An example of the present invention is set forth below. It is intended merely as an illustration and it is to be appreciated that the process described may be varied by one skilled in the art without departing from the spirit and scope of the invention.

EXAMPLE I

A sample of n-type gallium arsenide having a resistivity of 1 ohm-cm was obtained from commercial sources. The material so obtained was cut in slices 20 mils thick and lapped and polished to 15 mils, polishing being effected by standard chemical techniques. Next, chromium was electroplated from a 1 percent solution of chromium in sulfuric acid upon the surface of a slice to a thickness of 1,000 A. Following, diffusion of the chromium into the gallium arsenide was effected by heating the structure to a temperature of the order of 880°C for 16 hours. Then a window was generated in the resultant semi-insulating film by depositing a conventional photoresist thereon and exposing, developing and etching. Next, a *p*-type region is formed in the window area by a standard diffusion technique utilizing ternary zinc sources as described in the literature. Finally, an ohmic contact comprising zinc doped gold is evaporated upon the p-type region and alloyed thereto and gold doped germanium applied to the n-type region and alloyed thereto to form the other ohmic contact. The resultant structure will evidence a passivated *p–n* junction.

EXAMPLE II

The procedure of Example I is repeated with the exception that gallium phosphide having a resistivity of 0.1 ohm-cm is employed as the Group III(*a*) – V(*a*) compound. The resultant structure will evidence a passivated *p–n* junction.

EXAMPLE III

The procedure of Example I is repeated with the exception that gallium arsenide phosphide having a resistivity of 0.1 ohm-cm is employed as the Group III(*a*) – V(*a*) compound. The resultant structure will evidence a passivated *p–n* junction.

What is claimed is:

1. A technique for the fabrication of a passivated *p–n* junction device comprising the steps of forming a semi-insulating layer upon the surface of an *n*-type group III–V compound semiconductor by coating the compound with a thin film of a material selected from the group consisting of chromium, lithium and iron and subsequently effecting diffusion of said material into the compound by heating the resultant assembly at elevated temperatures, generating a window in said semi-insulating layer by photolithographic and etching techniques and introducing a *p*-type dopant through said window into the *n*-type material, thereby resulting in the formation of a *p–n* junction.

2. Technique in accordance with claim 1 wherein said compound semiconductor is gallium arsenide.

3. Technique in accordance with claim 1 wherein said compound semiconductor is gallium phosphide.

4. Technique in accordance with claim 1 wherein said compound semiconductor is gallium arsenide phosphide.

5. Technique in accordance with claim 1 wherein said p-type dopant is zinc doped.

6. Technique in accordance with claim 1 wherein said thin film is chromium.

7. Technique in accordance with claim 6 wherein the thickness of said thin film ranges from 500 to 1,500 A.

8. Technique in accordance with claim 7 wherein said compound semiconductor is gallium arsenide.

* * * * *